United States Patent [19]

Füglein

[11] 4,415,619
[45] Nov. 15, 1983

[54] WORKPIECE PALETTE

[75] Inventor: Egon Füglein, Aachen, Fed. Rep. of Germany

[73] Assignee: Sachs Systemtechnik GmbH, Schweinfurt, Fed. Rep. of Germany

[21] Appl. No.: 207,779

[22] Filed: Nov. 17, 1980

Related U.S. Application Data

[63] Continuation of Ser. No. 58,206, Jul. 17, 1979, abandoned.

[30] Foreign Application Priority Data

Jul. 20, 1978 [DE] Fed. Rep. of Germany ....... 2831893
Jul. 20, 1978 [DE] Fed. Rep. of Germany ....... 2831894

[51] Int. Cl.³ .................. B65D 19/44; B32B 5/14
[52] U.S. Cl. .......................... 428/131; 108/51.1; 248/346; 428/137; 428/212; 428/332; 428/343; 428/355
[58] Field of Search .............. 428/131, 137, 212, 343, 428/213, 215, 332, 355; 108/51.1, 55.1, 901; 248/359; 269/16, 20, 321 A, 13; 264/335, 500

[56] References Cited

U.S. PATENT DOCUMENTS 3,415,478 12/1968 Williams ....................... 428/131
3,458,388 7/1969 Moynihan ..................... 428/214
3,994,764 11/1976 Wolinski ........................ 428/425

FOREIGN PATENT DOCUMENTS 1039444 3/1959 Fed. Rep. of Germany .
237046 4/1968 Fed. Rep. of Germany .
2535681 2/1977 Fed. Rep. of Germany .
2651929 5/1978 Fed. Rep. of Germany .
2706554 8/1978 Fed. Rep. of Germany .

Primary Examiner—Paul J. Thibodeau
Attorney, Agent, or Firm—Toren, McGeady and Stanger

[57] ABSTRACT

A workpiece palette for transporting workpieces between stations includes a palette plate covered with an adhesive coating thicker than 0.35 mm. Preferably the coating has a thickness of between 0.5 and 2 mm. According to an embodiment, it is made of a polyurethane material that is dried on one side at least more than the other, and applied with the stickier face to the palette plate. In one embodiment, the plate is perforated and fluid forced through the holes for easy removal of the adhesive.

The polyurethane material is cross-linkable and made from acrylate copolymerizate or acrylate mixed polymerizate.

5 Claims, 4 Drawing Figures

WORKPIECE PALETTE

This is a continuation of application, Ser. No. 058,206 filed July 17, 1979 now abandoned.

BACKGROUND OF THE INVENTION

The invention relates to a workpiece palette for transporting workpieces between work stations, wherein the surface of the palette intended for receiving the workpieces is plane and carries an adhesive coating.

Such a workpiece palette is known from the German Offenlegungsschrift No. 25 35 681. The workpieces are held on the palette by the adhesive to prevent their falling off during the transport. The adhesive coating usually has a thickness of 20 $\mu$m to 120 $\mu$m. It has now been found that the adhesive coating of such palettes becomes dirty relatively quickly; as a result, the holding power is reduced and the workpieces are no longer securely held on the palette. Therefore, the adhesive coating of known palettes must be replaced relatively frequently and, for this purpose, a foil of polyvinyl chloride plastic is applied which, in turn, is glued onto the palette and is peeled off after it is worn and is replaced by a new foil.

In the known workpiece palettes, the adhesive coating is applied on a polyvinyl chloride foil serving as support which, in turn, is fastened on the palette by means of an adhesive or the like. Accordingly, the adhesive coating applied on the foil can be replaced when necessary. This composite adhesive-foil material has the disadvantage that it is relatively expensive.

An object of the invention is to improve palettes of this type.

Another object of the invention is to provide a palette whose adhesive coating can be made insensitive to contamination and, whose adhesiveness to workpieces of irregular contour can be improved.

Another object of the invention is to provide improved methods for removing the coating.

SUMMARY OF THE INVENTION

According to a feature of the invention, these objects are attained at least in part by making the adhesive coating thicker than 0.35 mm. Preferably, the adhesive coating has a thickness of between 0.5 and 2 mm. In adhesive coatings of this thickness, dirt and dust particles do not only adhere to the surface. On the contrary, the adhesive coating absorbs the dirt and dust particles, so that the adhesive property which is primarily determined by the cleanness of the surface is retained for a long time. Moreover, workpieces are more easily embedded in thick adhesive coatings since their protruding surface regions sink into the adhesive coating. More particularly, also workpieces with indeterminable positions of equilibrium, for example, balls, can be embedded in thick adhesive coatings. Furthermore, surprisingly, it has been found that thick adhesive coatings are able, more than thin adhesive coatings, to transmit the dynamic forces which act on the workpieces. In addition, thick adhesive coatings avoid the unwanted cohesion rupture which can easily occur in thin coatings; this rupture may occur when stress concentrations develop due to obstructions to the flow of the adhesive and when portions of the adhesive adhere to the workpiece when the workpiece is removed.

According to another feature of the invention, a layer of elastic material, for example, foam material or the like, supports the adhesive coating. This facilitates problem-free retention on the palette of workpieces even of the type with especially small or strongly curved surfaces. The elastic layer permits even coarse contaminations to penetrate it when a workpiece is placed on the adhesive coating. As a result, this prevents these contaminations from projecting beyond the adhesive coating.

According to another feature of the invention, the production costs for a replaceable adhesive coating are reduced by applying the adhesive coating directly on the palette with the surface of the adhesive coating facing away from the palette having a lower adhesive strength than the other surface. The adhesive coating is made in its entire thickness from one and the same initial material which, after being rolled to a layer, is subjected to a drying process only on that side which is intended for receiving the workpieces. The drying process reduces the adhesive strength of this side relative to the other side. During the drying process, the components of the adhesive which are responsible for the tackiness or the adhesive strength of the adhesive coating travel from the side to be dried to the opposite side and can even increase the adhesiveness or tackiness of the latter. According to a preferred embodiment of the invention, a material based on polyurethane particularly suitable as adhesive, is used. More particularly, the invention uses an adhesive on the basis of a two-component polyurethane system since, in this case, the adhesive properties can be adjusted by appropriately mixing the two components.

The tensile strength of the aforementioned, homogenous adhesive coating is not especially high so that no problems can arise when the adhesive coating is to be removed for replacement. According to the invention, such adhesive coatings are removed by forcing a fluid between the surface of the workpiece palette and the adhesive coating attached thereon. The fluid may be compressed air or a liquid, for example, water, or a solvent for the adhesive. The coating can be removed by first lifting it manually at a corner and then forcing the liquid under the adhesive coating by means of a manually guided nozzle. Such removal is relatively simple for the workmen involved.

According to a preferred embodiment, the palette has a plurality of ducts which open out at the surface that carries the adhesive coating and are connected to a supply line for the fluid. Preferably, the palette has two spaced, approximately parallel plates. The space between the plates forms the fluid supply line and one of the plates has a plurality of perforating holes. The fluid forced into the space between the plates emerges through the holes and lifts off the adhesive coating over the entire surface of the palette in one work step. This accelerates the replacement of the adhesive coating.

These and other features of the invention are pointed out in the claims. Other objects and advantages of the invention will become evident from the following detailed description, when read in light of the accompanying drawings.

DESCRIPTION OF PREFERRED EMBODIMENTS

Figure 1:
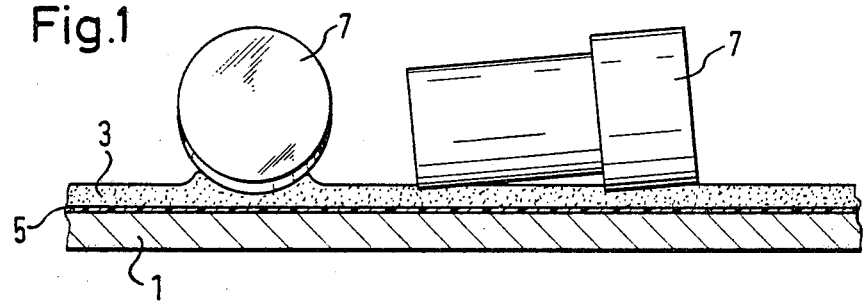
FIG. 1 is a cross-sectional view of a portion of a first embodiment of a workpiece palette.

In FIG. 1, a workpiece palette includes a planar palette plate 1, an adhesive coating 3, and a carrier foil 5 for the adhesive coating 3. The carrier foil 5 is composed of polyvinyl chloride and is itself releasably fastened to the palette plate 1 by means of an adhesive, not shown, so that the composite material of adhesive coating 3 and carrier foil 5 can be peeled off the palette plate 1 and can be replaced when necessary. The adhesive coating 3 has a thickness of at least 0.35 mm, preferably between 0.5 and 2 mm, so that the workpieces 7 to be fastened on the workpiece palette can sink into the adhesive coating 3. This makes the contact surface between the workpieces 7 and the adhesive coating 3 larger so that also rolling workpieces 7 adhere even when the workpiece palette is in an inclined position. The relatively thick adhesive coating 3 has a high capability of absorbing dirt and particles. Moreover, in adhesive coatings which have such a thickness, a uniform stress distribution can be achieved, so that high dynamic forces acting on the workpieces, for example those resulting from vibrations, can be absorbed.

Figure 2:
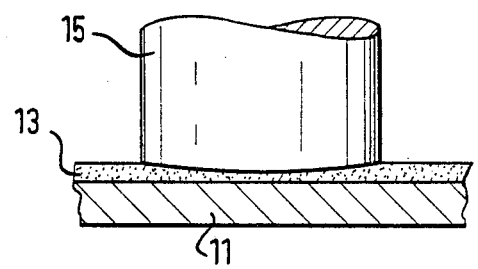
FIG. 2 is a cross-sectional view of a portion of another embodiment of a workpiece palette.

In contrast to the structure of FIG. 1, the embodiment of the workpiece palette shown in FIG. 2 includes a palette plate 11 on which an adhesive coating 13 is applied directly. The adhesive coating 13 again has a thickness of at least 0.35 mm, preferably 0.5 mm to 2 mm. The coating is made of a homogenous adhesive material, particularly on the basis of a two-component polyurethane. The polyurethane is completed by drying the side facing away from the palette plate 11. This makes the side intended for receiving workpieces 15 to be held less adhesive than the side facing toward the palette plate 11. As a result, the workpieces 15 can be removed from the adhesive coating 13 which is attached to the palette plate 11 without the adhesive coating 13 being separated from the palette plate 11.

Figure 3:
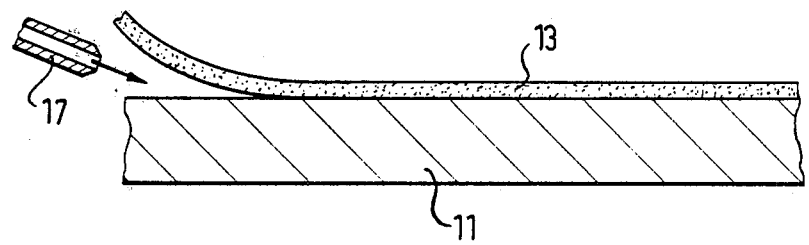
FIG. 3 is a schematic illustration of a method for removing the adhesive coating from the workpiece palette.

Due to its flowability the coating 13 of the workpiece palette according to FIG. 2 has a relatively low tensile strength. In order to make it possible to remove the adhesive coating 13 from the palette plate 11, it is lifted manually in the region of an edge or corner from the palette plate 11, as illustrated in FIG. 3. A manually guided nozzle is used to spray a fluid, for example, compressed air, water or a solvent for the adhesive coating 13 into the thus created gap. In this manner, the raised adhesive coating 13 can be lifted off with relatively little pull and possibly may be wound onto a mandrel.

Figure 4:
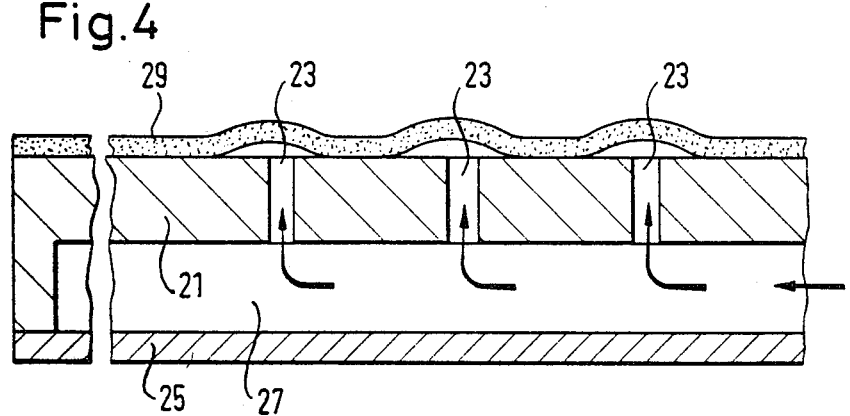
FIG. 4 is a cross-sectional view of a portion of a workpiece palette with devices for removing the adhesive coating.

FIG. 4 shows a workpiece palette having a plurality of holes 23 which pass through its palette plate 21. The holes 23 open out into an intermediate space 27 formed between the palette plate 21 and another plate 25. Outside of the region of the holes 23, the plate 25 is tightly connected to the palette plate 21 so that a fluid introduced under pressure into the space 27 emerges through the holes 23 and removes the adhesive coating 29 which is glued onto the free surface of the palette plate 21 over a large surface in one workstep. According to various embodiments, the fluid again is compressed air, water or a solvent for the adhesive material. The adhesive coating 29 preferably corresponds in its structure to the adhesive coating 13 of the workpiece palette according to FIG. 2. According to another embodiment, it is an adhesive-carrier foil composite material similar to the workpiece according to FIG. 1. The adhesive-carrier foil composite material of the workpiece palette according to FIG. 1 is, according to an embodiment of the invention, removed manually by means of a fluid and a nozzle according to FIG. 3.

While embodiments of the invention have been described in detail, it will be obvious to those skilled in the art that the invention may be embodied otherwise without departing from its spirit and scope.

The polyurethane in 3,13 and 29 in the drawings is made from polypropylene glycol, acrylate copolymerizate, terpene phenol resin, methyl ester, colophonium, toluylene diisocyanate, and stannous octoate.

What is claimed is:

1. A workpiece palette for transporting workpieces between work stations, comprising a palette plate having a plane surface for receiving the workpieces, said plate carrying a polyurethane adhesive coating, said coating being thicker than 0.35 mm wherein said adhesive coating directly contacts the surface of said palette plate, said adhesive coating having two surfaces, the surface of the coating which faces away from said palette plate having a lower adhesive strength than the other surface and wherein said palette plate forms a plurality of ducts which open into the surface carrying said adhesive coating and communicates with a fluid supply source.

2. A workpiece palette according to claim 1, wherein said adhesive coating has a thickness of between 0.5 mm and 2 mm.

3. A workpiece palette according to claim 1, wherein said palette plate includes two approximately parallel flat sections spaced a distance from one another, thus forming therebetween said fluid supply source, one of said sections forming a plurality of through-going holes.

4. A palette as in claim 1 wherein said coating is exposed directly to the surrounding environment.

5. A palette as in claim 3, wherein said coating is exposed directly to the surrounding environment.

* * * * *